United States Patent [19]

Anderson et al.

[11] 3,920,595

[45] Nov. 18, 1975

[54] HIGH SOLIDS ALKYD COATING COMPOSITIONS

[75] Inventors: Carl C. Anderson, Hartland, Wis.; Roger M. Christenson, Gibsonia, Pa.; Egon Fritz Wiegmann, Saint Saulve, France

[73] Assignee: PPG Industries, Inc., Pittsburgh, Pa.

[22] Filed: Apr. 10, 1974

[21] Appl. No.: 459,515

[52] U.S. Cl.... 260/22 CQ; 117/132 R; 117/132 BE; 117/161 K; 117/161 KP; 117/DIG. 7; 260/21; 260/22 EP; 260/22 TN; 260/31.4 R; 260/31.4 EP; 260/31.6

[51] Int. Cl.² .................. C09D 3/52; C09D 3/66

[58] Field of Search....... 260/22 CQ, 22 EP, 22 TN, 260/21

[56] References Cited
UNITED STATES PATENTS

| | | | |
|---|---|---|---|
| 2,634,245 | 4/1953 | Arnot | 260/29.2 E |
| 3,070,256 | 12/1962 | Bremmer et al. | 260/29.2 E |
| 3,247,145 | 4/1966 | Masters et al. | 260/21 |
| 3,404,018 | 10/1968 | Hicks | 260/22 EP |
| 3,433,753 | 3/1969 | Farkas et al. | 260/22 EP |
| 3,440,193 | 4/1969 | Campagna | 260/22 R |
| 3,446,764 | 5/1969 | Phillips et al. | 260/22 R |
| 3,494,882 | 2/1970 | Andrews | 260/22 R |
| 3,658,737 | 4/1972 | Irwin | 260/21 |
| 3,749,758 | 7/1973 | Gannon | 260/22 EP |
| 3,778,395 | 12/1973 | Huelsmann et al. | 260/22 TN |
| 3,862,072 | 1/1975 | Sekmakas | 260/29.4 R |

OTHER PUBLICATIONS

Patton, Alkyd Resin Technology, Interscience Publishers, N.Y. N.Y., 1962, pp. 1,2,3,16–20,1-20–122,157,163 and 164.

*Primary Examiner*—Ronald W. Griffin
*Attorney, Agent, or Firm*—Frank J. Troy

[57] ABSTRACT

High solids coating compositions, the vehicle comprising an alkyd resin, a reactive liquid and a crosslinking agent. The reactive liquid and the alkyd resin are crosslinked with the crosslinking agent. Reactive liquids used in the instant composition must have at least one hydroxyl group. Crosslinking agents such as aminoplast resins and isocyanato-terminated compounds are useful. These high solids coating compositions provide hard, durable and attractive coatings on various articles such as steel doors, furnace cabinets, metal furniture, and the like.

19 Claims, No Drawings

HIGH SOLIDS ALKYD COATING COMPOSITIONS

Background of the Invention

In recent years, ecological considerations have created an increasing interest in high solids coatings on the part of the coatings industry. High solids coatings which can be applied by conventional techniques such as spraying, dipping, roll coating and the like without the use of significant amounts of organic solvents or dispersants are of particular interest. The use of such high solids coatings presents several important advantages, including high film build per application; economy of materials since normally the solvents, which are expensive and increasingly difficult to obtain, are lost to the ambient surroundings and the diminution of environmental control problems such as treatment of plant effluents to capture or destroy volatile pollutants.

Summary of the Invention

A high solids coating composition, the vehicle comprising an alkyd resin, a reactive liquid having at least one hydroxyl group and a crosslinking agent. The reactive liquid contains at least one hydroxyl group, preferably two or more, and reacts with the crosslinking agent when the composition is cured. Aminoplast resins and isocyanato-terminated compounds are useful as crosslinking agents.

Description of the Preferred Embodiments

The term "high solids" as employed throughout the specification means those compositions in which the vehicle has a solids content of at least 70 percent by weight. The compositions of the invention may have solids contents ranging from about 70 to about 95 percent by weight with a solids content of about 80 percent by weight being preferred.

The term "alkyd resin" as used throughout this specification refers to resins produced by reacting a polyfunctional alcohol, a polyfunctional acid (or acid anhydride) and an oil or oil fatty acid. These resins are variously referred to in the art as oil-modified polyesters or oil-modified alkyds.

Polyfunctional alcohols which can be used in preparing the alkyd resins of this invention include glycerine, trimethylolethane, trimethylolpropane, pentaerythritol, sorbitol, mannitol, ethylene glycol, diethylene glycol, 2,3-butylene glycol and similar polyols. Glycerine is a preferred polyfunctional alcohol.

Polyfunctional acids which can be used in preparing the alkyd include phthalic acid, maleic acid, fumaric acid, isophthalic acid, succinic acid, trimellitic acid, adipic acid, azelaic acid, sebacic acid, and the like, as well as the anhydrides of such acids. A preferred polyfunctional acid anhydride is phthalic anhydride.

The oil employed in preparing the alkyd can be a saturated oil such as coconut oil or a drying or semi-drying oil, such as linseed oil, soya oil, safflower oil, perilla oil, tung oil, oiticica oil, poppyseed oil, sunflower oil, dehydrated castor oil, herring oil, menhaden oil, sardine oil and the like. The above oils can be used per se or in the form of a fatty acid. In addition to the above oils and fatty acids, tall oil fatty acids can be used and are preferred because of their availability and cost.

The alkyd resin of this invention is produced by methods well known in the art employing conventional techniques and procedures. Thus, for example, the alkyd can readily be prepared by the simple interaction of a mixture of a polyfunctional alcohol, a polyfunctional acid (or acid anhydride) and a fatty acid. Where the oil per se is employed, it becomes necessary as is well known in the art, to first convert the oil to a mono- or diglyceride by alcoholysis with glycerol before adding the acid or acid anhydride and esterifying. As will be recognized, the type and amounts of the various components which make up the alkyd resin can be varied widely, depending upon the physical characteristics desired in the resin.

The reactive liquid component of the high solids composition may in general be defined as a liquid having at least one hydroxyl group and which is substantially non-volatile under the conditions at which the coating composition is cured (i.e., baked or dried). Thus, the term "non-volatile" as applied to the reactive liquid herein refers to the volatility of the reactive liquid at the conditions under which the coating composition is to be cured. Hence, the term "non-volatile" as employed herein means that the reactive liquid will have a boiling point in excess of the temperature utilized to cure the coating.

This is an essential factor since the compositions of this invention are formulated in such a manner that when the composition is cured the reactive liquid will react with the crosslinking agent and remain permanently in the resultant film. Accordingly, care must be exercised in selecting a reactive liquid so that the liquid chosen will not volatilize off before crosslinking has occurred.

While reactive liquids having one hydroxyl group may be used in the compositions of the invention, reactive liquids having two or more hydroxyl groups are preferred. A reactive liquid having three hydroxyl groups is especially preferred. Thus, monohydric alcohols, polyhydric alcohols, polyether polyols, polyester polyols, or mixtures thereof may be used.

Monohydric alcohols which may be used as a reactive liquid depending on curing conditions include those having a carbon chain numbering up to about 18 atoms. Such alcohols include primary, secondary, and tertiary alcohols, such as 1-nonanol, 2,6-dimethyl-4-heptanol, 2,6,8-trimethyl-4-nonanol, 5-ethyl-2-nonanol, 7-ethyl-2-methyl-4-undecanol, and lauryl alcohol. While monohydric alcohols may be used as the sole reactive liquid, it is preferable that they be used in combination with polyhydric alcohols or other polyols. Polyhydric alcohols useful as a reactive liquid include diethylene glycol, triethylene glycol, polyethylene glycol, dipropylene glycol, polypropylene glycol, glycerol, neopentyl glycol, pentaerythritol, trimethylolpropane, trimethylolethane and the like.

Polyester polyols useful as a reactive liquid may be prepared by reacting a polyol in excess with a polycarboxylic acid in known manner. Thus, polyols such as ethylene glycol, diethylene glycol or the like glycols containing from about 2 to 12 carbon atoms may be reacted with a polycarboxylic acid (or anhydride) such as adipic acid, succinic acid, maleic acid, fumaric acid, phthalic acid, isophthalic acid, or the like acids containing up to 12 carbon atoms.

Polyether polyols useful as reactive liquids may be prepared by reacting a polyol in excess with an alkylene oxide in known manner. For example, polyols such as sucrose, sorbitol, glycerol, or the like, preferably containing up to about 10 carbon atoms may be reacted with an alkylene oxide such as ethylene oxide, propylene oxide, butylene oxide or a mixture of such oxides to produce a useful polyether polyol. The resulting polyether polyols may also be reacted with anhydrides and carboxylic acids to form adducts which may be used as a reactive liquid.

The preferred reactive liquids include various diols and triols, with the triols being particularly preferred.

In general, diols which may be employed for use as reactive liquids include glycols of the formula $HO-(CH_2)_n-OH$, wherein $n$ equals 2 to 10, glycols of the formula $HO-(CH_2CH_2O)_nH$ and $HO-[CH(CH_3)CH_2O]_nH$, in which $n$ equals 1 to 40, such as diethylene glycol, 2,2-dimethyl-1,3-propanediol, 2,2-diethyl-1,3-propanediol, 3-methyl-1,5-pentanediol, 2-methyl-2-ethyl-1,3-propanediol, 2-ethyl-1,3-hexanediol and 2,2-dimethyl-3-hydroxypropyl-2,2-dimethyl-3-hydroxypropionate. Other useful diols include N-methyl and N-ethyl diethanolamines, 4,4'-methylenebiscyclohexanol, 4,4'-isopropylidene-bis-cyclohexanol and various xylenediols, hydroxymethylphenethyl alcohols, hydroxymethyl-phenyl-propanols, phenylenediethanols, phenylenedi-propanols, heterocyclic diols, such as 1,4-piperazine diethanol, polyactone diols and poly-caprolactone diols. The preferred diols include 2-methyl-2-ethyl-1,3-propanediol, 2-ethyl-1,3-hexanediol and 2,2-dimethyl-3-hydroxypropyl-2,2-dimethyl-3-hydroxypropionate. An especially preferred diol is an adduct of propylene glycol commercially available from Wyandotte Chemical Company under the tradename Pluracol P410.

The preferred triols which may be employed include compounds such as trimethylolpropane trimethylolethane, 1,2,2-propanetriol, 1,2,4-butanetriol, 1,2,6-hexane triol, polycaprolactone triols and triols based on adducts of propylene oxide and glycerine. A polycaprolactone triol suitable for use as a reactive liquid herein is an adduct of trimethylolpropane and epsilon-caprolactone commercially available from Union Carbide Company under the trade name Niax Polyol PCP–0300. Especially preferred triols are the trifunctional polyol adducts of glycerine and propylene oxide commercially available from Wyandotte Chemical Company under the tradenames Pluracol GP330, –430, and –730.

As indicated above, crosslinking agents such as aminoplast resins, and isocyanato-terminated compounds may be employed in the compositions of this invention.

Aminoplast resins which can suitably be employed include aminealdehyde resins, i.e., an aldehyde condensation product of melamine, urea, acetoguanamine, or a similar compound. Generally, the aldehyde employed is formaldehyde, although the products can be made from other aldehydes, such as, for example, acetaldehyde.

While resins produced from melamine or urea are most common and are preferred, condensation products of other amines and amides can also be employed, such as, for example, those of triazines, diazines, triazoles, guanidines, guanamines, and alkyl and aryl-substituted derivatives of such compounds, including alkyl and aryl-substituted melamine, provided at least one amino group is present. Some examples of such compounds are N,N'-dimethylurea, benzyl urea, dicyanodimide, formoguanamine, benzoguanamine, ammeline, 2-chloro-4,6-diamino-1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6-trihydrazine-1,2,5-triazine, 2,4,6-triethyltriamine-1,3,5-triazine, 2,4,6-triphenyltriamino-1,3,5-triazine, and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; mono-ethers of glycols, such as the Cellosolves and Carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Some of the preferred aldehyde condensation products of melamine include hexamethoxymethyl melamine, hexakis(methoxymethyl)melamine, ethoxymethoxymethyl melamine, hexylated methylated methylol melamine and the like.

As indicated, isocyanato-terminated compounds may also be employed as crosslinking agents in the coating compositions of this invention. Isocyanato-terminated compounds which may suitably be employed are those materials generally referred to as polyisocyanates. The term polyisocyanate as used herein includes aliphatic polyisocyanates, aromatic polyisocyanates, and isocyanate-terminated prepolymers. Typical of the polyisocyanates contemplated for use as crosslinking agents are the aliphatic compounds such as trimethylene, tetramethylene, pentamethylene, hexamethylene, 1,2-propylene, 1,2-butylene, 2,3-butylene, 1,3-butylene, ethlidine and butylidene diisocyanates; and cycloalkylene compounds such as 1,3-cyclopentane, 1,4-cyclohexane and 1,2-cycloxane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolyene, or mixtures thereof, 4,4'-toluidine and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4'-4''-triisocyanates; 1,3,5-triisocyanates benzene and 2,4,6-triisocyanate toluene; and the tetraisocyanates such as 4,4'-diphenyldimethyl methane-2,2', 5,5'-tetra isocyanate; the polymerized polyisocyanates such as tolylene diisocyanate dimers and trimers, and the like.

While the above-mentioned polyisocyanates may be used as such, it is often advantageous to employ a polyisocyanate as a crosslinking agent for the coating compositions of this invention. Blocked polyisocyanates are well known in the art and are prepared by reacting or partially reacting polyisocyanates such as those described above with suitable blocking agents which will split off at the temperature used to cure the coating composition thereby regenerating the isocyanate groupings for crosslinking purposes.

Typical compounds which can be used to block the isocyanate groupings, e.g., by forming carbamates therewith, are monohydric phenols, such as phenol, meta-cresol, para-cresol, ortho-cresol and mixtures thereof; the xylenols, e.g., 2,6-dimethyl phenol, 4-ethyl phenol, 4-tertiary butyl phenol, 2-butyl phenol, 4-n-octyl phenol, 4-iso-octyl phenol, 2-chlorophenol, 2,6-dichloro phenol, 2-nitro phenol, 4-nitro phenol, 3-nitro phenol; monohydric alcohols such as methyl alcohol, ethyl alcohol, n-propyl alcohol, isopropyl alcohol, tertiary butyl alcohol, tertiary amyl alcohol, octyl alcohol, stearyl alcohol acetoacetic ester; hydroxyalkylcarbamic acid aryl esters, e.g., hydroxyethylcarbamic acid phenyl ester, hydroxyethylcarbamic acid cresyl ester; diethyl malonate; mercaptans, e.g., 2-mercaptobenzothiazole, 2-mercaptothiazoline, dodecyl mercaptan, ethyl 2-mercaptothiazole, β-naphthyl mercaptan, α-naphthyl mercaptan, methyl mercaptan, butyl mercaptan; lactams, e.g., ε-caprolactam, Δ-valerolactam, γ-butyrolactam, β-propiolactam imides; e.g., succinimide, phthalimide, naphthalimide, glutarimide; dimethylphenyl carbinol; secondary amines, e.g., o-ditolylamine, m-ditolylamine, p-ditolylamine, N-phenyl toluidine, phenyl-α-naphthylamine, carbazole, diphenylamine, etc.; mono-α-phenylethyl phenol; di-α-phenylethyl phenol; tri-α-phenylethyl phenol; carvacol; thymol; methyl diphenyl carbinol; triphenyl carbinol; 1-nitro tertiary butyl carbinol; 1-chlorotertiary butyl carbinol; triphenyl silanol; 2,2'-dinitrophenylamine; 2,2'-dichloro diphenylamine; ethyl n-butyl malonate; ethyl benzyl malonate; acetyl acetone; acetonyl acetone; benzimidazole; 1-phenyl-3-methyl-5-pyrazolone.

Specific examples of such blocked polyisocyanates are (1) a polyisocyanate wherein the isocyanate groups of the reaction product of 3 moles of mixed 2,4- and 2,6-tolylene diisocyanate with trimethylolpropane are blocked by esterification with phenol, and (2) a polyisocyanate wherein the mixed cyclic trimers of 2,4- and 2,6-tolylene diisocyanates have the three free isocyanate groups blocked by esterification with m-cresol.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or acetoacetic acid ester of phenol or cresylic acid or ε-caprolactam or 2-mercaptobenzothiazole or succinimide or phthalimide or diphenylamine or phenyl-β-naphthylamine, triphenyl methane, triisocyanate having the isocyanate groups blocked with phenol or mixed cresols or tertiary butyl alcohol or phthalimide, 1,3,3-pentanetriisocyanate having the isocyanate groups blocked with m-cresol, etc.

Typical of the isocyanate-terminated prepolymers contemplated for use herein are prepolymers prepared by reacting an excess of an aliphatic or aromatic diisocyanate or polyisocyanate such as those described above with a hydroxyl-terminated polyether or polyester. As is well known in the art, hydroxyl-terminated polyethers are in general prepared by reacting an excess of a polyol with an alkylene oxide. These materials have previously been described in the reactive liquid section of this specification. Examples of suitable hydroxyl-terminated polyethers contemplated for use herein include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can also be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sobitol, methyl glucosides, sucrose and the like with alkylene oxides such as ethylene oxide, propylene oxide, their mixtures, and the like.

Hydroxyl-terminated polyesters and their method of preparation are also well known in the art. These materials have also been described previously in the reactive liquid section above. In general, as described above, these materials are prepared by reacting an excess of a polyol such as ethylene glycol, propylene glycol, diethylene glycol and the like with an acid such as phthalic acid, isophthalic acid or an anhydride of said acids.

When an isocyanato-terminated compound is employed as a crosslinking agent, it is preferred that the molar ratio of the isocyanato-terminated compound to the alkyd resin be about 1:1.

The amounts of alkyd resin, reactive liquid and crosslinking components used in the vehicle of the high solids composition may vary substantially depending upon the physical and chemical properties desired in the finished coating. The vehicle may contain from about 10 to about 70 percent, preferably from about 25 to about 50 percent by weight of alkyd resin component; from about 25 to about 70 percent, preferably from about 25 to about 40 percent by weight of reactive liquid component and from about 5 to about 50 percent, preferably from about 10 to about 30 percent by weight of crosslinking agent.

The high solids coating composition of this invention in addition to the alkyd resin, reactive liquid and crosslinking agent may contain various adjuvants which are well known in the coating art. For example, the coating composition may contain pigments such as titanium dioxide, carbon black, talc, barytes, zinc sulfate, strontium chromate, barium chromate, ferric iron oxide, and dyes such as cadmium yellow, cadmium red, toluidine red, and the like. There may also be included in the composition other adjuvants such as antioxidants, wetting agents, driers, antifoaming agents, suspending agents, flow leveling agents, flexibilizing agents, corrosion inhibitors, bactericides, adhesive additives, various color tints, and the like.

Particularly useful adjuvants which may be employed in the compositions of this invention are the polyepoxide resins. Minor proportions of these resins contribute to improved chemical resistance, adhesion and flexibility.

Polyepoxide resins which may advantageously be employed include any epoxide compound or mixture which has a 1,2-epoxy equivalence of greater than 1.0. Such polyepoxides comprise a relatively large class of materials and have been described in numerous U.S. Pat. Nos. e.g., 2,461,171, 2,615,007, 2,716,123, 3.030,336, 3,053,855, and 3,075,999, incorporated herein by reference.

The preferred polyepoxides are the polyglycidyl ethers of polyhydric compounds. These are prepared, for example, by reaction of the polyhydric compound with epichlorohydrin or dichlorohydrin in the presence of an alkali. One class of preferred polyhydric compounds are the polyphenols, and particularly Bisphenol A (para, para'-isopropylidenediphenol). Other phenolic compounds that can be utilized include 4,4'-dihydroxyl-benzophenone, bis(4-hydroxyphenyl)-1-1-ethane, bis(4-hydroxyphenol)-1-1-isobutane, bis(4-hydroxyphenol)-1-1-isobutane, bis(4-hydroxyl-tertiary-butylphenyl)-2,2-propane, bis(2-hydroxynaphthyl)methane, or a novolak resin or similar polyphenol resin. Other polyhydric compounds that can be utilized include polyhydric alcohols such as ethylene glycol, diethylene glycol, triethylene glycol, 1,2-propylene glycol, 1,4-butylene glycol, 2,4,6-hexanetriol, glycerol and the like. In addition to epichlorohydrin, the epoxy component of the polyepoxide resin may include such compounds as 1-chloro-2,3-epoxy butane, 1-chloro-3,4-epoxy butane, 2-chloro-3,4-epoxy butane, 1-bromo-2,3-epoxy pentane, 1-bromo-4-methyl-3,4-epoxy pentane, 4-chloro-2-methyl-2,3-epoxy pentane, and the like.

The high solids coating compositions of this invention can be prepared in a relatively uncomplicated manner. Thus, the alkyd resin component (previously prepared to a solids content of from about 95 to 100 percent by weight) is first blended with the reactive liquid component to produce a resin vehicle having a viscosity suitable for mixing and coating application purposes. The alkyd resin-reactive liquid blend is then admixed with the crosslinking component and any desired adjuvants (e.g., pigments, dyes, etc.), employing mixing procedures and conditions well known in the paint mixing art.

High solids coating compositions so produced can be applied to a variety of substrates such as steel, aluminum, wood and the like using ordinary methods of application, such as reverse roll coating, spraying, dipping and the like. The coating can then be cured (e.g., baked) to form an attractive, hard and adherent film.

Curing schedules will vary considerably based upon the alkyd resin, the reactive liquid, the presence or absence of catalysts, and the specific crosslinking agents employed. Typical curing schedules include from about 5 to about 40 minutes at from about 225°F. to about 450°F. with aminoplast resins. In some instances, the composition may be cured at ambient temperature when isocyanato-terminated compounds are used as crosslinking agents.

The following examples are submitted to further illustrate the nature of the present invention and should not be considered as a limitation on the scope thereof. All parts and percentages in the examples and throughout the specification are by weight unless otherwise specified.

EXAMPLE 1

This example illustrates the preparation of a typical alkyd resin for use in the high solids coating compositions of this invention.

To a reactor equipped with a heating mantle, stirrer, thermometer, reflux condenser and water trap was charged 2.56 pounds of tall oil fatty acid, 1.73 pounds of high gravity glycerine, 2.71 pounds of phthalic anydride and 0.25 pounds of xylene. This mixture was heated to reflux and held at reflex temperature with periodic sampling of the reaction mixture until a sample of the reaction product reduced with toluene to 65 percent weight solids exhibited a Gardner-Holdt viscosity of Y at which time the reaction was considered to be complete. The resultant product is a tall oil alkyd resin having a solids content of about 98 percent, an acid number of about 10, an hydroxyl number of 125, and a Gardner-Holt viscosity of Z-4 at 25°C.

EXAMPLE 2 and 3

These examples illustrate high solids compositions of this invention employing reactive liquids having two and three hydroxyl groups. The compositions were prepared in accordance with the procedure set forth in the specification above. The coating compositions have the following formulations:

| Ingredients | Parts by Weight Exam. 2 | Exam. 3 |
|---|---|---|
| Alkyd resin of Example 1 | 51.0 | 32.7 |
| Pluracol P-410(1) (reactive liquid) | 30.6 | — |
| Pluracol GP-430(2) (reactive liquid) | — | 32.7 |
| Hexakis(methoxymethyl)melamine(3) | 18.4 | 34.6 |
| Total | 100.0 | 100.0 |

(1)A polyoxypropylene derivative of propylene glycol having a hydroxyl functionality of 2, an average molecular weight of 425, a hydroxyl number of 265, and a viscosity at 77°F. of 75 centipoises.
(2)An adduct of glycerine and propylene oxide having a hydroxyl functionality of 3, an average molecular weight of 400, a hydroxyl number of about 400, and a viscosity at 77°F. of 350 centipoises.
(3)A 100 percent solids crosslinking agent having a molecular weight of about 390.

The composition of Example 2 has a solids content of about 97 percent by weight and a viscosity of $Z_2$–$Z_3$, (ASTM solids 2M 105°C.) The composition of Example 3 has a solids content of about 98 percent by weight and a viscosity of $Z_1$–$Z_2$.

Films produced by curing the above coating compositions exhibit good adhesion, hardness and solvent resistance.

EXAMPLES 4 through 7

In these examples, pigmented high solids alkyd coating compositions of this invention were evaluated. The compositions were prepared in accordance with the method described in the specification above and had the following formulations:

| Ingredients | Parts by Weight Exam. 4 | Exam. 5 | Exam. 6 | Exam. 7 |
|---|---|---|---|---|
| Alkyd resin of Example 1* | 278.0 | 278.0 | 250.5 | 264.0 |
| Pluracol P-410 | 167.0 | — | — | 83.0 |
| Pluracol BP-730(1) | — | 167.0 | — | — |
| Pluracol GP-430 | — | — | 150.0 | 75.0 |
| Hexakis(methoxymethyl)melamine | 100.0 | 100.0 | 152.0 | 126.0 |
| Titanium dioxide | 240.1 | 240.1 | 240.1 | 240.1 |
| Acid catalyst(2) | 10.0 | 10.0 | 10.0 | 10.0 |
| Cellosolve acetate | 31.9 | 31.9 | 31.9 | 31.9 |
| Total | 827.0 | 827.0 | 834.5 | 830.0 |

*Reduced to 60 percent solids in Toluene.
(1)An adduct of glycerine and propylene oxide having a hydroxyl functionality of 3, an average molecular weight of 730, a hydroxyl number of 230, and a viscosity at 77°F. of 260 centipoises.
(2)The acid catalyst is para toluene sulfonic acid.

The above compositions were spray applied to steel panels, cured for 15 minutes at 325°F. and evaluated for various physical and chemical properties. Test results are shown in the table.

TABLE

| EXAMPLE NO. | FILM THICKNESS | % SOLIDS* BY WEIGHT | 60° GLOSS | IMPACT (IN LBS.) REVERSE | IMPACT (IN LBS.) DIRECT | ADHESION | FLEX CONICAL | MEK RESISTANCE | PENCIL HARDNESS | 150 HR. SALT SPRAY (CORROSION CREEP-IN INCHES)** |
|---|---|---|---|---|---|---|---|---|---|---|
| 4 | 1.4 ± 1 | 81 ± 1 | 79 | 40 | 100 | Excellent | 80% | OK | HB | 6⅔ |
| 5 | 1.4 ± 1 | 81 ± 1 | 80 | 40 | 100 | Excellent | 80% | OK | 2H | 6 |
| 6 | 1.4 ± 1 | 81 ± 1 | 90 | >10 | 60 | Good | 50% | OK | 4H | 7⅔ |
| 7 | 1.4 ± 1 | 81 ± 1 | 85 | >10 | 60 | Good | 80% | OK | 3H | 6⅔ |

*As determined on the composition prior to curing.
**150 hours in a 5 percent aqueous NaCl solution.

We claim:

1. A coating composition having a solids content of at least 70 percent by weight, the vehicle comprising a blend of:
   A. from about 10 to about 70 percent by weight of an alkyd resin comprising the reaction product of a polyfunctional alcohol, a polyfunctional acid or acid anhydride, and an oil or oil fatty acid;
   B. from about 25 to about 70 percent by weight of a reactive liquid having two or more hydroxyl groups, said reactive liquid being selected from the group consisting of polyether polyols, polyester polyols, polyhydric alcohols and mixtures thereof; and
   C. from about 5 to about 50 percent by weight of a cross-linking agent, said crosslinking agent being selected from the group consisting of aminoplast resins, expoxy resins and isocyanate-terminated compounds.

2. The composition of claim 1 wherein the alkyd resin is the reaction product of glycerine, phthalic anhydride, and tall oil fatty acid.

3. The composition of claim 1 wherein the reactive liquid is an adduct of glycerine and propylene oxide having three hydroxyl groups.

4. The composition of claim 1 wherein the reactive liquid is a polyoxypropylene derivative of propylene glycol having two hydroxyl groups.

5. The composition of claim 1 wherein the crosslinking agent is an amine-aldehyde condensation product.

6. The composition of claim 5 wherein the amine-aldehyde condensation product is hexakis(methoxymethyl)melamine.

7. The composition of claim 1 further containing pigment.

8. The composition of claim 7 wherein the pigment is titanium dioxide.

9. The composition of claim 1 wherein the reactive liquid is a polyether polyol.

10. The composition of claim 1 wherein the reactive liquid is a polyester polyol.

11. A method of preparing a coating composition having a solids content of at least 70 percent by weight comprising the steps of:
    A. reacting a polyfunctional alcohols, a polyfunctional acid or acid anhydride, and an oil or oil fatty acid to produce an alkyd resin having a solids content of from about 95 to about 100 percent by weight;
    B. blending from about 10 percent to about 70 percent by weight of the alkyd resin produced in step (A) with from about 25 percent to about 70 percent by weight of a reactive liquid having two or more hydroxyl groups, said reactive liquid being selected from the group consisting of polyether polyols, polyester polyols, polyhydric alcohols, and mixtures thereof to produce a mixture of said alkyd resin and said reactive liquid; and
    C. blending the mixture produced in step (B) with from about 5 percent to about 50 percent by weight of a crosslinking agent selected from the group consisting of aminoplast resins, epoxy resins and isocyanate-terminated compounds.

12. The method of claim 11 further comprising the step of adding pigment to the composition after step (C).

13. The method of claim 11 wherein the pigment is added after step (B).

14. The method of claim 11 wherein the alkyd resin comprises the reaction product of glycerine, phthalic anhydride, and tall oil fatty acid.

15. The method of claim 11 wherein the reactive liquid is an adduct of glycerine and propylene oxide having three hydroxyl groups.

16. The method of claim 11 wherein the reactive liquid is a polyoxypropylene derivative of propylene glycol having two hydroxyl groups.

17. The method of claim 11 wherein the crosslinking agent is hexakis(methoxymethyl)melamine.

18. The method of claim 11 wherein the reactive liquid is a polyether polyol.

19. The method of claim 11 wherein the reactive liquid is a polyester polyol.

* * * * *